United States Patent [19]

Suehiro et al.

[11] Patent Number: 5,395,893
[45] Date of Patent: Mar. 7, 1995

[54] POLYPROPYLENE RESIN COMPOSITIONS, COATING PROCESS FOR MOLDINGS THEREOF AND ITS COATED MOLDINGS

[75] Inventors: Keigo Suehiro; Katsuyuki Nitta; Takeaki Inokuma; Chihiro Ogawa, all of Kanagawa; Osamu Aoki, Tochigi; Kenji Hamabe, Tochigi; Atsushi Takeuchi, Tochigi, all of Japan

[73] Assignee: Mitsui Toatsu Chemicals, Inc., Tokyo, Japan

[21] Appl. No.: 70,855

[22] Filed: Jun. 3, 1993

[30] Foreign Application Priority Data

Jun. 10, 1992 [JP] Japan .................. 4-175010

[51] Int. Cl.$^6$ .............................................. C08K 5/10
[52] U.S. Cl. ............................................... 524/280
[58] Field of Search ........................................ 524/280

[56] References Cited

U.S. PATENT DOCUMENTS 4,255,301 3/1981 Minagawa et al. .................. 524/280

FOREIGN PATENT DOCUMENTS 429236 5/1991 European Pat. Off. .

OTHER PUBLICATIONS

WPIL-Derwent: AN 90-243011 & JPA-2169681 (29 Jun. 1990).
WPIL-Derwent: AN 92-162672 & JPA-4100816 (2 Apr. 1992).
WPIL-Derwent: AN 86-221363 & JPA-61151235 (9 Jul. 1986).

*Primary Examiner*—Peter D. Mulcahy
*Attorney, Agent, or Firm*—Burns, Doane, Swecker & Mathis

[57] ABSTRACT

A polypropylene resin composition which comprises (A) 100 parts by weight of polypropylene, (B) 20-50 parts by weight of at least one elastomer selected from an ethylenic elastomer, an hydrogenated styrene-butadiene copolymer and a hydrogenated styrene-isoprene block copolymer, (C) 0.3~20 parts by weight of polycarbonatediol having a skeleton of aliphatic carbonate with both terminals being a hydroxyl group and (D) 0~50 parts by weight of an inorganic filler. The resin composition can provide a molded article having a good adhesive property to a film applied thereon without pretreatment by a halogen-containing solvent.

5 Claims, No Drawings

POLYPROPYLENE RESIN COMPOSITIONS, COATING PROCESS FOR MOLDINGS THEREOF AND ITS COATED MOLDINGS

BACKGROUND OF THE INVENTION

1. Field of the Invention

The present invention relates to a polypropylene resin composition excellent in the adhesion strength of coated film applied thereon and more particularly, to an impact-resistant polypropylene resin composition preferably used in the production of exterior equipment for automobiles such as bumpers, a method for coating a molded article formed from the polypropylene resin composition, in particular, exterior equipment for automobiles such as bumpers, and the coated molded article.

2. Description of the Prior Art

Polypropylene resins have a wide variety of applications because of low density, high rigidity, high heat resistance and high resistance to chemicals. However, it is known that polypropylene resins are essentially nonpolar and accordingly, inferior in the adhesion strength of coated film applied thereon. For instance, when polypropylene bumpers for automobiles are coated, it is necessary to pre-treat the article with a halogen atom-containing organic solvent such as 1,1,1-trichloroethane (hereinafter referred to as trichlene) and then apply an undercoat of a primer thereto, or to subject it to plasma-irradiation, prior to the application of a top coat in order to ensure sufficient adhesion strength of the coated film.

However, the conventional methods as described above require a large number of steps and it takes a long time for practicing these steps. Moreover, it has been feared that the halogen atom-containing organic solvents used in the pre-treatment may adversely affect the human body and environment and accordingly a countermeasure therefor must be urgently considered. For the reason that trichlene destroys the global environment, particularly the ozone layer, it was decided at the Montreal Meeting in June of 1990 that their production and use would be prohibited worldwide from 2005. The fact that this problem is not easy to be solved is clear from the fact that a postponement of 15 years was set. Thereafter, it was revealed that the destruction in the global environment was too rapid and thus, advance performance starting from 1996 has recently been decided. This is an extremely difficult problem to be urgently solved. Further, there has been required the improvement of the coating method conventionally employed while taking into consideration time and expenses required for the treatments of waste liquor generated after the coating.

Also, as for gasoline used in automobiles, gasolines containing an additive such as methyl-tert-butyl ether are used and accordingly, the requirement of a material resistant to solvents for automobile parts becomes severe.

Thus, it is strongly wanted to develop a coating method for automobile parts not requiring the pre-treatment with trichlene prior to the coating step and a resin composition for automobile parts.

There have been proposed methods for improving the adhesive property of a molded article formed from compositions mainly comprising polypropylene resins and elastomers which comprise adding, to the composition, a diene polymer having terminal hydroxyl groups or a hydrogenated product thereof [see, for instance, Japanese Unexamined Patent Publication (hereinafter referred to as "J. P. KOKAI") Nos. Hei 3-157168, Hei 4-77567, Hei 4-93330 and Hei 3-277636]. The purpose of these methods is to apply a coating without application of any primer coating and/or plasma-irradiation.

However, when an article to be coated is not degreased and washed with trichlene, various problems arise in more severe evaluation of adhesive property of the resulting coated article. For instance, the coated film is insufficient in resistance to solvent and the coated film near the gate portions is peeled off in the X-shaped cross hatch mark test.

Moreover, it has been a recent tendency, in North America, South America, Europe or the like to use a so-called gasohol which is a mixture of gasoline for automobiles and lower alcohols such as methanol, ethanol and butanol for the purposes of saving natural resources and of reduction of cost. The gasohol exerts severe influence on the peeling properties of coating films as compared with the gasoline per se and, therefore, there has been desired for the improvement of these polypropylene molded articles in the resistance to gasohol.

SUMMARY OF THE INVENTION

Accordingly, an object of the present invention is to provide an impact-resistant polypropylene resin composition capable of providing molded articles which have substantially improved adhesion to a coated film applied thereon, and in particular, to provide an impact-resistant polypropylene resin composition which is excellent in the adhesive property and which can suitably be used for the production of external parts for automobiles such as bumpers.

Another object of the present invention is to provide an improved method for coating a molded article obtained through molding of the foregoing resin composition, which can accept a top coat directly or after application of a primer coat or plasma-irradiation without requiring degreasing and washing with a halogen-containing organic solvent such as trichlene.

A still further object of the present invention is to provide a molded article obtained according to the foregoing coating method and in particular, to provide an external part for automobiles, which is excellent in adhesion strength to the coated film and resistance to gasohol (resistance to mixtures of gasoline and oxygen-containing compounds).

Under such circumstances, the inventors of this invention have diligently studied and have found that if a molded article is produced from a polypropylenen composition which comprises incorporating into polypropylene at least one elastomer selected from ethylenic elastomers, hydrogenated styrene-butadine copolymers and hydrogenated styrene-isoprene block copolymers, a specific polycarbonatediol and organic fillers in a specific compounding ratio, the resulting molded article does not require any pre-treatment with a halogen atom-containing organic solvent such as trichlene, can accept a top coat directly or after application of a primer coat or plasma-irradiation and has substantially improved adhesion to the coated film and excellent appearance. The present invention has thus been completed on the basis of this finding.

According to an aspect of the present invention, there is provided a polypropylene resin composition which comprises:

(A) 100 parts by weight of polypropylene, (B) 20~50 parts by weight of at least one elastomer selected from an ethylenic elastomer, a hydrogenated styrene-isoprene block copolymer, and a hydrogenated styrene-butadiene block copolymer, (C) 0.3~20 parts by weight of polycarbonatediol represented by formula I,

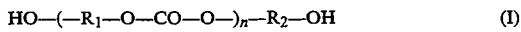

$$HO—(—R_1—O—CO—O—)_n—R_2—OH \qquad (I)$$

wherein $R_1$ and $R_2$ are an aliphatic hydrocarbon group and n is an integer of 1~20, and (D) 0~50 parts by weight of an inorganic filler.

According to another aspect of the present invention, there is provided a coating method which comprises the steps of molding the foregoing polypropylene resin composition to give a molded article and applying a top coat directly or after application of a primer coat or plasma-irradiation on the surface of the molded article without applying any pre-treatment with a halogen atom-containing organic solvent.

According to a further aspect of the present invention, there is provided a coated molded article obtained by coating an article molded from the foregoing polypropylene resin composition according to the foregoing coating method.

DESCRIPTION OF THE PREFERRED EMBODIMENTS

The polypropylene used as Component (A) in the present invention is not restricted to specific ones so far as they are crystalline polypropylenes and specific examples thereof are homopolymer of propylene and random or block copolymers of propylene with, ethylene and/or α-olefin. The α-olefin herein means, for instance, butene-1, pentene-1, hexene-1 and 4-methylpentene-1 and these α-olefins may be used alone or in combination of at least two of them.

In the present invention, block copolymers of propylene and ethylene are preferably used as Component (A), with the use of such block copolymers having ethylene content of 2 to 25% by weight and melt index(MI) of 1 to 100 g/10 min (ASTM D-1238, at 230° C.) being particularly preferred.

Component (B) used in the present invention is at least one elastomer selected from ethylenic elastomers, hydrogenated styrene-butadiene block copolymers and hydrogenated styrene-isoprene block copolymers.

Examples of the ethylenic elastomers are a random copolymeric rubber of ethylene and propylene (hereinafter referred to as EPM), an ethylene-propylene-diene terpolymeric rubber (hereinafter referred to as EPDM), an ethylene-butene-1 copolymeric rubber and an ethylene-propylene-butene-1 terpolymeric rubber. EPM and/or EPDM are preferably used and more preferably, EPDM or a mixture of EPM with EPDM is used.

As for EPM, the propylene content is 10~60 wt. %, preferably, 15~60 wt. % and more preferably, 20~55 wt. %. The Mooney Viscosity $ML_{1+4}(100° C.)$ is 10~80, preferably 15~60 and more preferably, 20~50.

As for EPDM, the propylene content is 10~60 wt. %, preferably 15~60 wt. % and more preferably 20~55 wt. %. The Mooney Viscosity $ML_{1+4}(100 ° C.)$ is 10~80, preferably 15~60 and more preferably 20~50. The iodine value is 5~30, preferably 7~25 and more preferably 8~20. The molecular weight distribution Mw/Mn is 1.5~4.0, which is measured by means of gel permeation chromatography.

Examples of the diene component in EPDM are ethylidene norbornene, dicylopentadiene and 1,4-hexadiene. It is preferred to use EPM having the propylene content of 15~25 wt. % and the Mooney Viscosity $ML_{1+4}(100° C.)$ of 15~25 and EPDM having the propylene content of 20~30 wt. %, the Moony Viscosity $ML_{1+4}(100° C.)$ of 35~45, the iodine value of 10~15 and the Mw/Mn of 1.5~2.5.

Polycarbonatediol used as component C in the present invention is one having a skeleton of aliphatic carbonate with both terminals of hydroxyl group, represented by the above-mentioned formula I. In the formula I $R_1$ and $R_2$ are preferably a group represented by CmHzm wherein m is an integer of 1~10. As for the polycarbonatediol, the molecular weight is 500~3000, preferably 600~2000 and more preferably 700~1500, the viscosity at 75° C. is 100~3000 cS, preferably 150~2500 and more preferably 200~1000. It is preferred to use one of liquid, solid or semi-solid at 20° C. and the solid one is particularly preferred. Further, the hydroxyl value is 20~300 KOH mg/g, preferably 30~200 KOH mg/g and more preferably 35~150 KOH mg/g. The typical example of the polycarbonatediol is poly-n-hexyl-polycarbonatediol.

The amount of component C is 0.3~20 wt. parts to 100 wt. parts of component A, polypropylene, preferably 0.5~10 wt. parts and more preferably 0.7~7 wt. parts.

In the present invention, inorganic fillers may be used as Component (D). Specific examples of such inorganic fillers are, for instance, calcium oxide, magnesium oxide, aluminum hydroxide, calcium hydroxide, magnesium hydroxide, magnesium carbonate, calcium silicate, magnesium silicate, calcium sulfate, calcium carbonate, barium sulfate, calcium sulfate, talc, clay, glass, mica, basic magnesium carbonate, dolomite, wollastonite, potassium titanate whisker and magnesium sulfate whisker. Among these, calcium carbonate, barium sulfate and talc are particularly preferred from the viewpoint of the balance between impact resistance and rigidity. When the impact resistance of the resulting composition is taken into consideration, the average particle size of the inorganic filler is preferably not more than 5 μm.

The inorganic filler (D) is incorporated into the resin composition in an amount ranging from 0 to 50 parts by weight per 100 parts by weight of the polypropylene component A. In use of bumpers for automobiles the amount is normally 0~30 wt. parts and preferably 0~20 wt. parts. In case for exterior parts of automobiles the amount is 10~50 wt. parts and 10~35 wt. parts.

Moreover, the foregoing inorganic filler may be surface-treated. Such surface-treatments can be performed by using, for instance, a variety of coupling agents such as silane and titanate coupling agents; and surface-treating agents such as higher fatty acids and unsaturated organic acids. The use of such inorganic fillers which are subjected to such a surface-treatment is effective for the improvement in the physical properties of the resulting composition such as kneadability, moldability, self-tap strength and weld strength in addition to the foregoing intended effects of the invention.

One of the preferred mode of embodiment of the present invention is directed to a polypropylene resin composition which comprises:

(A) polypropylene, (B) an ethylene-propylene-diene terpolymeric rubber having a propylene content of 15~50% by weight, a Mooney viscosity $ML_{1+4}(100° C.)$ of 20~60, an iodine value of 8–25 and a molecular weight distribution Mw/Mn of 1.5~4.0, (C) polycarbonatediol of formula (I),

$$HO-(-R_1-O-CO-O-)_n-R_2-OH \qquad (I)$$

wherein $R_1$ and $R_2$ are an aliphatic hydrocarbon group and n is an integer of 1~20, and (D) an inorganic filler, The content of component (B) being 10~60% by weight based on the total weight of component (A)+(B), the content of component (C) being 0.5~10% by weight based on the total weight of components (A)+(B)+(C) and the content of component (D) being 0~40 parts by weight based on 100 parts by weight the total weight of components (A)+(B)+(C).

The resin composition of the present invention may contain further, in addition to the components A to D, at least one member selected from the group consisting of high-density polyethylene, low-density polyethylene, linear low-density polyethylene and very low-density polyethylene in an amount such that they do not adversely influence the intended effects of the present invention.

Further, the resin composition may contain a compound having OH group other than polycarbonatediol, for example polyhydroxy polyolefin in an amount such that it does not adversely influence the effects of the present invention.

In addition, the resin composition may contain, if necessary, additives such as antioxidants, heat stabilizers, UV absorbers, flame retardants, nucleating agents, workability improvers, lubricants, antistatic agents and pigments which have been commonly used in olefinic polymers.

The polypropylene resin composition of the present invention can be produced by mixing the foregoing components in, for instance, a Henschel mixer commonly employed in the art, then kneading in a single-screw extruder, a twin screw extruder, a roll mill or a Banbury mixer and then pelletizing the mixed and kneaded components.

The resin composition thus produced can be molded into desired articles according to any molding method usually used such as injection molding, extrusion molding and compression molding methods.

The coating method of the present invention comprises the steps of molding the foregoing polypropylene resin composition to give a molded article and applying a top coat directly or after application of a primer coat or plasma-irradiation on the surface of the molded article without using any pre-treatment with a halogen atom-containing organic solvent on the surface. This coating method may comprise, if necessary, a step for degreasing and washing with an organic solvent other than halogen atom-containing solvents. Examples of the organic solvents other than halogen atom-containing solvents include lower alcohols such as isopropyl alcohol and surfactant-containing alkali or acid aqueous solutions.

The primers for an undercoat used in the coating method of the invention include commercially available acrylic chlorinated polypropylene primers normally used for polypropylene. The primer is prepared according to the specifications of the manufacturer and then applied to a molded article in a thickness of, for instance, about 10 μm.

In the coating method of the present invention, it is possible to use various coating compositions such as a two-pack urethane coating composition, a one-pack alkyd-melamine coating composition and a one-pack acrylic as a top coat, but particularly preferred are low temperature (for instance, 80° C.)—curable urethane coating compositions since the molded article coated with such coating compositions exhibits excellent resistance to gasoline and gasohol and highly improved adhesion to the coated film applied thereon and thus, the effects of the resin composition of the present invention become substantially remarkable.

In the coating method of the present invention the top coat may be applied directly on the molded article without the primer for undercoat, through it is preferred to use the primer for undercoat to render the coated film resistant to solvent.

The present invention will hereinafter be explained in more detail with reference to the following Examples, but the present invention is by no means limited to these specific Examples.

Each component used in the resin composition will be detailed below.

PP-A: Crystalline ethylene-propylene block copolymer (ethylene content: 9.0% by weight; MI(at 230° C.): 22 g/10 min.).

PP-B: Crystalline ethylene-propylene random copolymer (ethylene content: 4.5% by weight; MI (at 230° C.): 15 g/10 min).

EPDM-A: Ethylene-propylene-diene terpolymer rubber having a propylene content of 40% by weight; a Mooney viscosity, $ML_{1+4}(100°$ C.), of 39; an iodine value of 15; a molecular weight distribution, Mw/Mn, of 2.2; and whose diene component is ethylidene norbornene.

EPDM-B: Ethylene-propylene-diene terpolymer rubber having a propylene content of 25% by weight; a Mooney viscosity, $ML_{1+4}(100°$ C.), of 40; an iodine value of 14; a molecular weight distribution, Mw/Mn, of 2.3; and whose diene component is ethylidene norbornene.

EPM-A: Ethylene-propylene copolymer rubber having a propylene content of 45% by weight; and a Mooney viscosity, $ML_{1+4}(100°$ C.), of 28.

EPM-B: Ethylene-propylene copolymer rubber having a propylene content of 20% by weight; and a Mooney viscosity, $ML_{1+4}(100°$ C.), of 23.

Polycarbonatediol: Poly-n-hexylcarbonatediol, Nippolan N-981(trade name; available from Nihon Polyurethane Industries, Ltd.) having a molecular weight of 990 and a viscosity at 75° C. of 330 cS.

talc: average particle size 2 μm.

Examples 1 to 7, Comparative Example 1 and Reference Example:

The foregoing components were mixed in amounts listed in the following Tables 1 in a Henschel mixer, then melted and kneaded in a twin-screw extruder whose temperature was set at 210° C. to give a resin composition in the form of pellets.

The bending modulus was determined according to ASTM D 790 and the Izod impact strength (notched) was determined at temperatures of 23° and −40° C. according to ASTM D256.

Test samples used in the adhesion test of coated film were prepared as follows:

A primer (available from Nippon Bee Chemical Co., Ltd. under the trade name of RB-150) was applied onto a test sample (80×240 mm; thickness 3 mm) obtained through injection molding in a thickness of coated film of 10 μm, dried at 80° C. for 10 minutes, followed by the preparation of an urethane coating composition Metallic (available from Nippon Bee Chemical Co., Ltd. under the trade name of R-212) and an urethane coating composition Clear (available from Nippon Bee Chemical Co., Ltd. under the trade name of R-213) according to the formulation specified by Nippon Bee Chemical Co., Ltd., application of these coating compositions to the surface of the primer layer in thicknesses of 20 μm and 30 μm respectively, drying at 80° C. for 30 minutes and allowing to stand at room temperature for 48 hours to give a test piece. Cross-shaped cuts were made on the coated film surface of each test piece in intervals of 1 mm to give a cross hatch pattern (10×10=100). Then a cellophane tape was firmly adhered to the cross hatch pattern by the application of manual pressure and rapidly peeled off at an angle of 45° C. The rate of remaining cross hatch pattern was determined after repeating twice the foregoing operations (the normal cross hatch mark test).

The resistance to gasoline and resistance to gasohol were determined by cutting each test sample into pieces of 80×30 mm such that the cross section of each piece was equally exposed, each piece was immersed in gasoline and gasohol (gasoline containing 10% by volume of ethyl alcohol) maintained at 23° C. and the time required till the coated film suffered from abnormality (peeling off, formation of blisters, wrinkles or the like) was determined.

The results obtained are listed in the following Table 1. The washing treatment with trichlene (1,1,1-trichloroethane) vapor in Reference Example was performed by exposing each test piece to saturated vapor of trichlene for 30 seconds. Thereafter, the test piece was dried, coated with a primer coat and then subjected to the same procedures as described above.

Example 8

Using the composition of Example 1, a test sample was prepared in the same manner as in Example 1. Onto this test sample was directly applied the urethane coating composition Metallic and urethane coating composition Clear used in Example 1 without the pretreatment by the trichlene vapor and also, without the coating of the primer. As a result of the cross hatch mark test, the cross hatch patterns were not at all peeled off.

Comparative Example 2

Using the composition of Comparative Example 1, the coating method was carried out in the same manner as in Example 8. In the cross hatch mark test, the cross hatch patterns were extensively peeled off.

The polypropylene resin composition of the present invention can provide molded articles having a good adhesive property to the coated film applied thereon without pretreatment by a halogen atom-containing solvent and has a high utility value in industry.

TABLE 1

| Resin Composition, part by weight | Ref Example | Examples 1 | 2 | 3 | 4 | 5 | 6 | 7 | Comparative Example 1 |
|---|---|---|---|---|---|---|---|---|---|
| PP - A | 70 | 67 | 67 | 67 | 67 | 68 | | 62 | 70 |
| PP - B | | | | | | | 67 | | |
| EPDM - A | 30 | 30 | | 20 | | 30 | | | 30 |
| EPDM - B | | | 30 | | 20 | | 20 | | |
| EPM - A | | | | 10 | | | | 35 | |
| EPM - B | | | | | 10 | | 10 | | |
| Polycarbonatediol | — | 3 | 3 | 3 | 3 | 2 | 3 | 3 | — |
| Talc | 7 | 7 | 7 | 5 | 7 | 7 | 7 | 10 | 7 |
| Trichlene pretreatment | Yes | No | No | No | No | No | No | No | No |
| Bending Modulus (kg/cm²) | 10,500 | 10,000 | 10,800 | 9,700 | 11,000 | 10,200 | 11,300 | 10,000 | 10,500 |
| Izod Impact Strength 23° C. | Not Broken | Not broken | Not broken | Not broken | Not broken | Not broken | Not broken | Not broken | Not Broken |
| (Kg · cm/cm) —40° C. | 13.0 | 12.9 | 11.5 | 14.0 | 11.0 | 13.0 | 0.5 | 8.5 | 13.0 |
| Cross Hatch Mark Test (Remaining Rate %) | 100 | 100 | 100 | 100 | 100 | 95 | 100 | 100 | 0 |
| Resistance to Gasoline (min) | >60 | >60 | >60 | >60 | >60 | >60 | >60 | >60 | 15 |
| Resistance to Gasohol (min) | >60 | >60 | >60 | >60 | >60 | >60 | >60 | >45 | 5 |
| Appearance of Molded Article | Good | Good | Good | Good | Good | Good | Good | Good | Good |

In any case, the following stabilizers were incorporated:
(a) 2,6-di-t-butyl-4-methylphenol 0.05 parts by weight
(b) calcium stearate 0.1 parts by weight
(c) tetrakis-[methylene-3-(3',5'-dibutyl-4'-hydroxyphenyl)propionate]methane 0.1 parts by weight
(d) bis(2,2,6,6-tetraniethyl-4-piperidyl) sebacate 0.3 parts by weight (based on 100 parts by wt. of the composition)

We claim:
1. A polypropylene resin composition which comprises:
(A) 100 parts by weight of polypropylene,
(B) 20~50 parts by weight of at least one elastomer selected from an ethylenic elastomer, a hydrogenated styrene-isoprene block copolymer, and a hydrogenated styrene-butadiene block copolymer,
(C) 0.3~20 parts by weight of polycarbonatediol represented by formula I,

$$HO-(-R_1-O-CO-O-)_n-R_2-OH \qquad (I)$$

wherein $R_1$ and $R_2$ are an aliphatic hydrocarbon group and n is an integer of 1~20, and
(D) 0~50 parts by weight of an inorganic filler.

2. A polypropylene resin composition of claim 1 wherein the ethylenic elastomer is an ethylene-propylene random copolymeric rubber, an ethylene-propylene-diene terpolymeric rubber, an ethylene-butene-1 copolymeric rubber and an ethylene-propylene-butene-1 copolymeric rubber.

3. A polypropylene resin composition of claim 2 wherein the ethylenic elastomer is an ethylene-propylene random copolymeric rubber and/or an ethylene-propylene-diene terpolymeric rubber.

4. A polypropylene resin composition of claim 1 wherein the polycarbonatediol of formula (I) has a molecular weight of 500 to 3000 and a viscosity at 75° C. of 200 to 3000 cs.

5. A polypropylene resin composition which comprises:

(A) polypropylene, (B) an ethylene-propylene-diene terpolymeric rubber having a propylene content of 15~50% by weight, a Mooney Viscosity $ML_{1+4}(100°\ C.)$ of 20~60, an iodine value of 8~25 and a molecular weight distribution Mw/Mn of 1.5~4.0, (C) polycarbonatediol of formula (I), $$HO-(-R_1-O-CO-O-)_n R_2-OH \qquad (I)$$

wherein $R_1$ and $R_2$ are an aliphatic hydrocarbon group and n is an integer of 1~20, and (D) an inorganic filler, a content of component (B) being 10~60% by weight based on the total weight of component (A)+(B), a content of component (C) being 0.5~10% by weight based on the total weight of components (A)+(B)+(C) and a content of component (D) being 0~40 parts by weight based on 100 parts by weight the total weight of components (A)+(B)+(C).

* * * * *